UNITED STATES PATENT OFFICE.

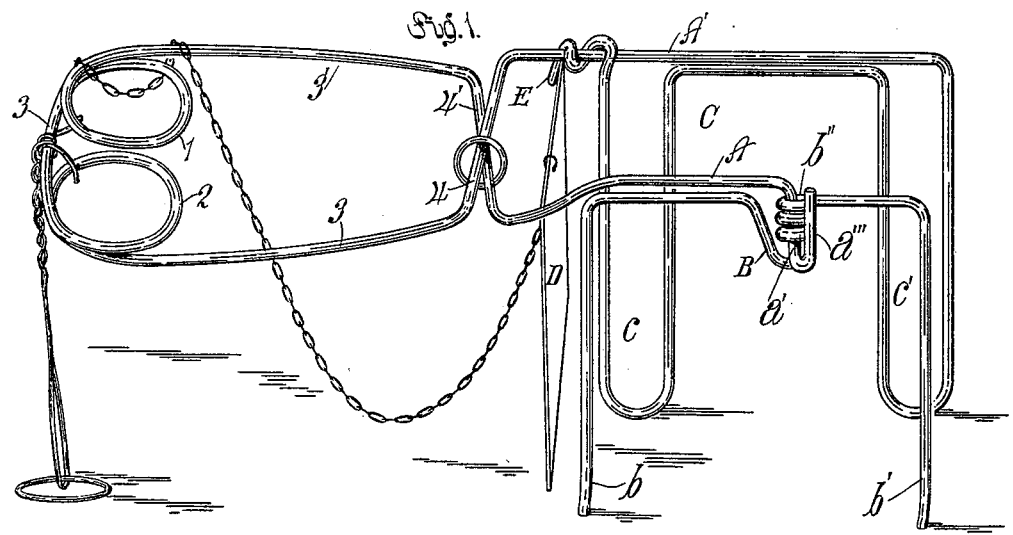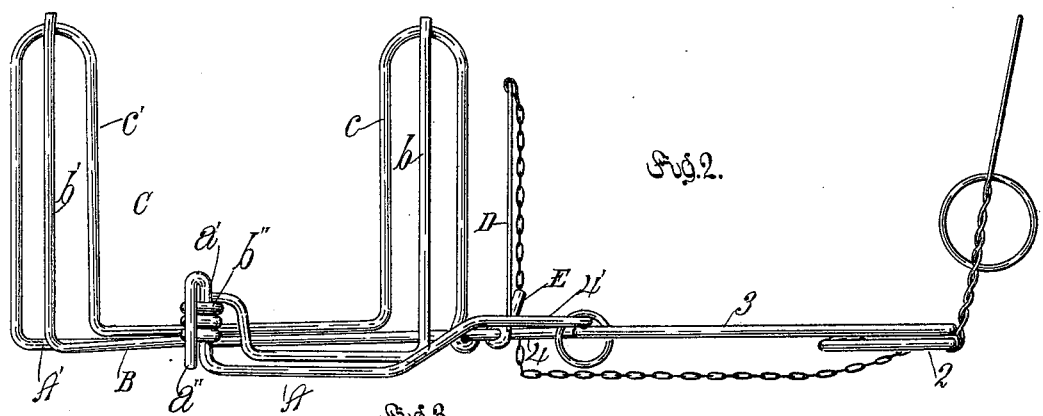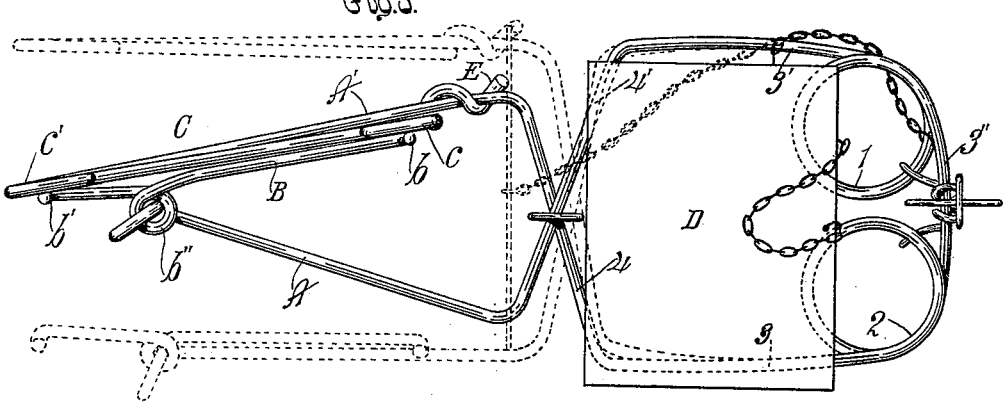

CHARLES WILLIAM ROTH, OF PIRU CITY, CALIFORNIA.

GOPHER-TRAP.

SPECIFICATION forming part of Letters Patent No. 619,996, dated February 21, 1899.

Application filed December 6, 1897. Serial No. 660,962. (No model.)

*To all whom it may concern:*

Be it known that I, CHARLES WILLIAM ROTH, a citizen of the United States, residing at Piru City, in the county of Ventura and State of California, have invented a new and useful Gopher-Trap, of which the following is a specification.

While my invention is especially designed for catching gophers, it is also adapted for catching other animals, and I do not limit its use to catching gophers.

I will now describe the special difficulties attending the catching of gophers—that is to say, a gopher while moving along his run is very liable to push before him a large bunch of grass, rubbish, or earth, so that the jaws of any trap set to catch the animal are liable to be clogged by the mass and the gopher allowed to escape when the trap is sprung. My invention overcomes the difficulties thus arising and is adapted for catching gophers of large and small size regardless of the rubbish or earth which they may push in front of them.

Another feature of my invention is its adaptability for fitting large or small holes, so that it is not necessary with my trap to fit the hole to the trap. This I accomplish by providing an oblong rectangular trip-plate.

The accompanying drawings illustrate my invention.

Figure 1 is a perspective view of my trap set in the preferred manner. Fig. 2 is a side elevation of the trap set in reversed position. Fig. 3 is a plan of the trap sprung. Dotted lines show the position of parts when the trap is open.

My trap has two spring-pressed jaw-carrying arms A A', the jaw B of one of said arms being pivoted to the arm A, which carries it. The said jaw B is provided with two fingers $b\ b'$ at its opposite ends and is pivoted between the said fingers to the arm A, which carries it. The jaw B is preferably formed of a wire bent into a coil at $b''$ to form the socket for the pivot which holds it. The other jaw C is provided with two loops $c\ c'$ parallel with the fingers $b\ b'$ to receive the same when the trap is closed. The jaw C is stationary on the arm A'.

D indicates a trip, guard, or pedal to rest between the arms to hold them apart.

E is a trigger-stud projecting from one of the arms A', and the trip D rests between said trigger-stud and the opposite arm to hold the trap open.

The trap is preferably composed in part of a loop of spring-wire provided at the looped end with two coils 1 2, and between the coils a spring member 3, the members of the loop being carried forward from the coils to form the sides 3 3' of a spring-frame 1 2 3' 3", and thence bent to cross each other, as at 4 4', and thence bent to form the jaw-carrying arms A A', the extension of one of said arms A' being bent to form one of the jaws of the trap, as at C $c\ c'$, and the other end being bent to form a pivot, as at $a'$, to which the other jaw B of the trap is pivoted. The end of the wire beyond the loop $c$ is bent around the arm A' and extends to form the trigger-stud E to receive the trip, guard, or pedal D between said stud and the opposite arm A. The trigger or guard D is preferably formed of an oblong rectangular piece of sheet metal to hold the arms apart, so that there are four corners with eight engaging edges of said sheet to stand the wear of the sheet incident upon setting the trap. The oblong form of this rectangular plate shown in the drawings enables the user to adjust the trap to fit wide or narrow holes. For a wide hole the length of the trip is inserted between the trigger-stud and the arm and for a narrow hole the width of the trip is inserted.

The end of the arm A is first bent to form the pivot $a'$ and then is bent back upon itself, as at $a''$, to form a stop, which serves the double purpose of holding the pivoted jaw B in place on the pivot and also intercepting one member of said jaw and preventing the jaw from turning so far as not to properly adjust itself with relation to the jaw C.

In practical operation the trap may be set in several positions; but the position shown in Fig. 1 is preferred for the reason that in that position there is less of the trap on the ground to rub along the ground when the trap is sprung. In setting, the trap is inserted into the gopher's run, the jaws being put into the hole after the trap has been set, as shown in Fig. 1. Then when the gopher approaches, the rubbish which he pushes in front of him will push the plate D, thus springing the trap, and the pivoted jaw will allow the jaw to turn around the rubbish and catch the gopher.

The use of the plate D for a trigger or trip guards against the passage of any gopher, large or small, without springing the trap.

The trigger-stud E is practically a part of the arm A', and it slopes rearward, so that when the plate is moved it readily slips from the stud and the trap is sprung; but my invention includes the use between the arms of the plate, whether the stud is used or not.

The two coils 1 2 of the spring-frame, being held apart by the connecting member 3, serve to give a broader base for the trap when it is placed in the position shown in Fig. 2, and the force of the springs for the jaw is greater than could be produced by a larger single coil instead of the two small coils; and, furthermore, the coils thus disposed allow the frame of the trap to lie nearly in a single plane.

Now, having described my invention, what I claim as new, and desire to secure by Letters Patent, is—

1. A trap having two spring-pressed jaw-carrying arms, the jaw of one of said arms being pivoted to the arm which carries it.

2. A trap having two spring-pressed jaw-carrying arms, the jaw on one of said arms being provided with two fingers at its opposite ends and being pivoted between said fingers to the arm which carries it; and the other jaw being provided with two loops parallel with the fingers to receive the same when the trap is closed.

3. The combination of the two spring-pressed arms, a jaw being stationary on one of said arms; a jaw pivoted on the other arm; and an oblong rectangular trip, guard or pedal to rest between the arms to hold them apart.

4. The combination of the two spring-pressed arms; a jaw fixed to one of said arms; a jaw pivoted to the other arm; a trigger-stud projecting from one of the arms; and a trip, guard or pedal to rest between the trigger-stud and the opposite arm to hold the trap open.

5. The trap composed in part of a loop of spring-wire provided at the looped end with two coils and between the coils a spring member, the members of the loop being carried forward from the coils to form the sides of a spring-frame and thence bent to cross each other and thence bent to form jaw-carrying arms; jaws fastened to said arms; and a trip, guard or pedal to rest between the arms to hold them apart.

6. A trap comprising a loop of wire bent to form two arms with a spring-frame connecting said arms to press the arms together and the extension of one of said arms being bent to form one of the jaws of the trap and the other arm being bent to form a pivot to which the other jaw of the trap is pivoted.

7. A trap comprising a wire bent to form two jaw-carrying arms with a spring-frame connecting said arms to force them together, an extension of one of said arms being bent to form two loops to constitute one of the jaws and the other arm being bent to form a pivot to which the other jaw is pivoted, said other jaw comprising two fingers to enter said loops when the jaw is closed.

8. The trap formed in part of a wire bent to form a spring-frame and two jaw-carrying arms, the extension of one of said arms being bent to form two parallel jaw-loops and the end of the wire being bent around such arm and extending to form a trigger-stud to receive the trip, guard or pedal between said stud and the opposite arm.

9. The combination of the wire bent to form the spring-frame, the jaw-carrying arms and one of the jaws, said jaw being composed of two parallel loops; a jaw composed of two fingers pivoted to the other jaw-carrying arm; a loop at the end of the spring-frame to form in conjunction with the jaws, legs for supporting the jaw-carrying frame; and a trip, guard or pedal for holding the arms apart.

10. The combination of the wire bent to form a spring-frame and two jaw-carrying arms, a jaw fixed to one of said arms and the end of the other arm being bent to form a pivot upon which the other jaw is pivoted and also bent back upon itself to form a stop to hold said jaw on said pivot and to prevent the same from turning too far on said pivot.

CHARLES WILLIAM ROTH.

Witnesses:
JAMES R. TOWNSEND,
WALTER HUGH FLEET.